United States Patent [19]

Sprague et al.

[11] Patent Number: 5,016,210
[45] Date of Patent: May 14, 1991

[54] BINARY DIVISION OF SIGNED OPERANDS

[75] Inventors: Brian J. Sprague; Gregory A. Portanova, both of Enfield, Conn.

[73] Assignee: United Technologies Corporation, Hartford, Conn.

[21] Appl. No.: 437,000

[22] Filed: Nov. 15, 1989

[51] Int. Cl.[5] ............................................. G06F 7/52
[52] U.S. Cl. ........................................................ 364/766
[58] Field of Search .................... 364/761, 764, 766

[56] References Cited

U.S. PATENT DOCUMENTS

| | | | |
|---|---|---|---|
| 4,320,464 | 3/1982 | Desmonds | 364/766 |
| 4,441,158 | 4/1984 | Kanuma | 364/758 |
| 4,503,512 | 3/1985 | Doran | 364/761 |
| 4,546,447 | 10/1985 | Sawada | 364/767 |
| 4,692,891 | 9/1987 | Yamaoka et al. | 364/766 |
| 4,777,613 | 10/1988 | Shahan et al. | 364/748 |
| 4,872,214 | 10/1989 | Zurawski | 364/766 |

FOREIGN PATENT DOCUMENTS

777839 6/1957 United Kingdom ................ 364/766

Primary Examiner—Dale M. Shaw
Assistant Examiner—Long T. Nguyen
Attorney, Agent, or Firm—Donald W. Muirhead

[57] ABSTRACT

A divider unit (15), having a divider circuit (16) and a divider controller (17), generates signed quotient and signed remainder signals in response to input signed dividend and signed divisor signals. The divider circuit (16) has an adder/subtracter unit (22), a mux (24), a zero/sign detector unit (23), and a shiftable register (28) which are controlled by the divider controller (17) and which cooperate to iteratively generate signed partial remainder and signed partial dividend signals, necessary for the computation of signed quotient and signed remainder signals, using either a restoring or non-restoring binary division algorithm.

4 Claims, 8 Drawing Sheets

NEGATIVE DIVIDEND/
NEGATIVE DIVISOR

NEGATIVE DIVIDEND/
POSITIVE DIVISOR

NEGATIVE DIVIDEND/
NEGATIVE DIVISOR

BINARY DIVISION OF SIGNED OPERANDS

DESCRIPTION

1. Technical Field

This invention relates to data processing systems and more particularly to apparatus for performing arithmetic operations, which may be used by data processing systems.

2. Background Art

Conventional restoring division is a recursive procedure wherein each recursion involves determining a quotient digit by subtracting the divisor from a partial dividend until the resulting value is negative. The quotient digit equals the number of subtractions minus one. The resulting value, called a "partial remainder", is used to form a new partial dividend for the next iteration. The procedure is terminated when all of the digits of the dividend have been used to form partial dividends. Restoring division is so named because the first step in forming a new partial dividend is to "restore" the negative partial remainder to a positive value by adding back the divisor.

For example, restoring division can be used to determine the quantity seventy-eight divided by three. Initially three (divisor) is subtracted from seven (the partial dividend) three times (i.e. until the result is negative). The quotient digit is two (i.e. one less than the number of subtractions). Three (the divisor) is added to the negative partial remainder, negative two, to obtain the value one. A new partial dividend of eighteen is formed by appending the eight (the next dividend digit) to the one. The last digit of the quotient, six, is determined by subtracting three (divisor) from eighteen (partial dividend) seven times (i.e. until the result is negative) and then subtracting one from seven. The six is appended to the two obtained from the previous recursion so that seventy-eight divided by three equals the quotient twenty-six. The procedure is terminated because all of the dividend digits have been used in the formation of partial dividends.

The restoring division algorithm is useful when applied to division of binary numbers. For each recursion, the divisor is subtracted only once from each partial dividend since each quotient digit can only be a one or a zero. If the partial remainder is a negative value, the quotient digit for that iteration is a zero and the negative partial remainder is restored by adding back the divisor. If the partial remainder is positive, the quotient digit for that iteration is a one.

Binary non-restoring division eliminates the restoration step of restoring division by adding, instead of subtracting, the divisor to the partial dividend on an iteration subsequent to an iteration which results in a negative partial remainder. Addition is proper in this instance because the partial dividend of the subsequent iteration, having been formed from the negative non-restored partial remainder of the previous iteration, is negative.

A drawback of both binary restoring division and binary non-restoring division is that both can only be applied to positive operands. Division of negative operands requires that the negative operands be converted to positive values prior to the division and that the result of the division be converted from a positive value to a negative value, if appropriate. Converting the operands and the result adds time to each division operation and tends to require more hardware for a circuit designed for binary restoring division.

The extra sign conversions can be avoided if each operand is represented as an unsigned binary number having a separate sign bit. Restoring or non-restoring division can be applied directly to unsigned binary operands to achieve an unsigned binary result. The sign bit of the result equals the exclusive or of the sign bit of the operands. For example, restoring division of unsigned binary values having separate sign bits is described by the IEEE Standard for Binary Floating-Point ANSI/IEEE Std. 754-1985. A device for implementing the IEEE standard is disclosed in U.S. Pat. No. 4,777,613 entitled "Floating Point Numeric Data Processor" (Shahan et al.).

However, while unsigned binary number representation reduces the number of steps for binary division, it increases the number of steps required for addition and subtraction since the sign bit of each operand must be examined before operands can be added or subtracted. Therefore, storing values as unsigned binary numbers having separate sign bits would increase the time and hardware needed for addition and subtraction of binary values.

DISCLOSURE OF INVENTION

Objects of the invention include improved apparatus for applying binary division to negative two's complement binary operands without having to first convert the operands.

According to the present invention, apparatus for providing binary division of a dividend signal and a divisor signal having opposite signs adds the divisor signal to each iteratively generated partial dividend signal having the same sign as the dividend signal. In further accord with the present invention, apparatus for providing binary division of a negative dividend signal provides for testing of bits of the dividend signal whenever an iteratively generated partial remainder signal equals zero. In further accord with the present invention, apparatus for providing binary division by a negative divisor signal sets a quotient signal bit for an iteration to a one in response to generation of a negative partial remainder signal.

The divider unit of the present invention provides division of fixed or floating point negative binary values without having to first convert negative values to positive values. It may be used for either restoring or non-restoring division. Elimination of the conversion step saves time in the division process and also reduces the amount of hardware required.

The foregoing and other objects, features and advantages of the present invention will become more apparent in light of the following detailed description of a best mode embodiment thereof, as illustrated in the accompanying drawings.

BEST MODE FOR CARRYING OUT THE INVENTION

Figure 1:
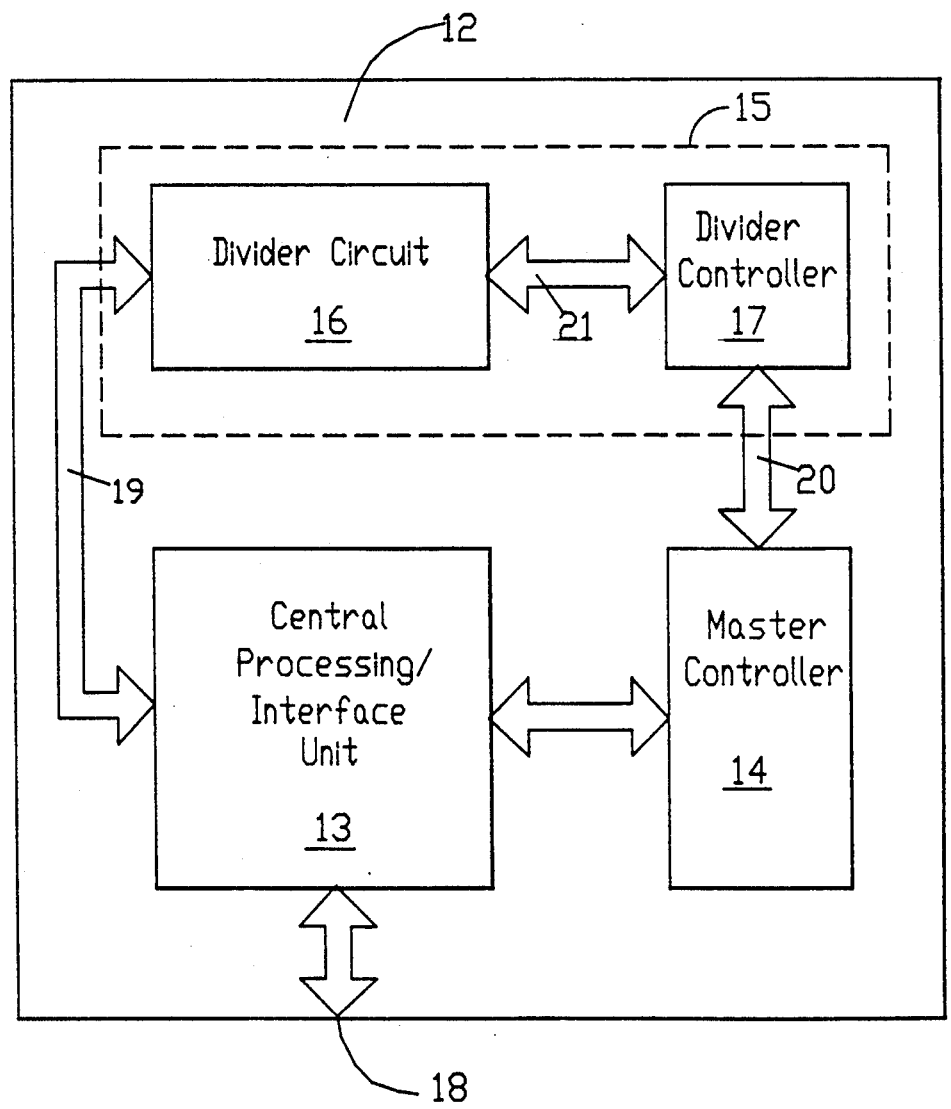
FIG. 1 is a schematic block diagram of a microprocessor in which the present invention may be used.

Referring to FIG. 1, a microprocessor 12 is comprised of a central processing/interface unit 13, a master controller 14, and a divider unit 15 which has a divider circuit 16 and a divider controller 17. The central processing/interface unit 13 is controlled by and exchanges control information with the master controller 14. The central processing/interface unit 13 contains registers, shifters, and other elements which are generally common to microprocessors. The central processing/interface unit 13 contains logic for providing external communication for the processor 12 by electronically communicating through a processor interface 18.

The divider unit 15 divides a dividend signal by a divisor signal to calculate a quotient signal and possibly a remainder signal signal. The dividend signal and the divisor signal are provided to the divider unit 15 by the central processing/interface unit 13 via a data bus 19 which is internal to the microprocessor 12 and which connects the divider unit 15 to the central processing/interface unit 13. The divider unit 15 transfers the quotient signal and the remainder signal to the central processing/interface unit 13 via the bus 19.

Control signals are exchanged between the master controller 14 and the divider unit 15 via a control bus 20 which is internal to the microprocessor 12 and which connects the master controller 14 to the divider controller 17.

Figure 2:
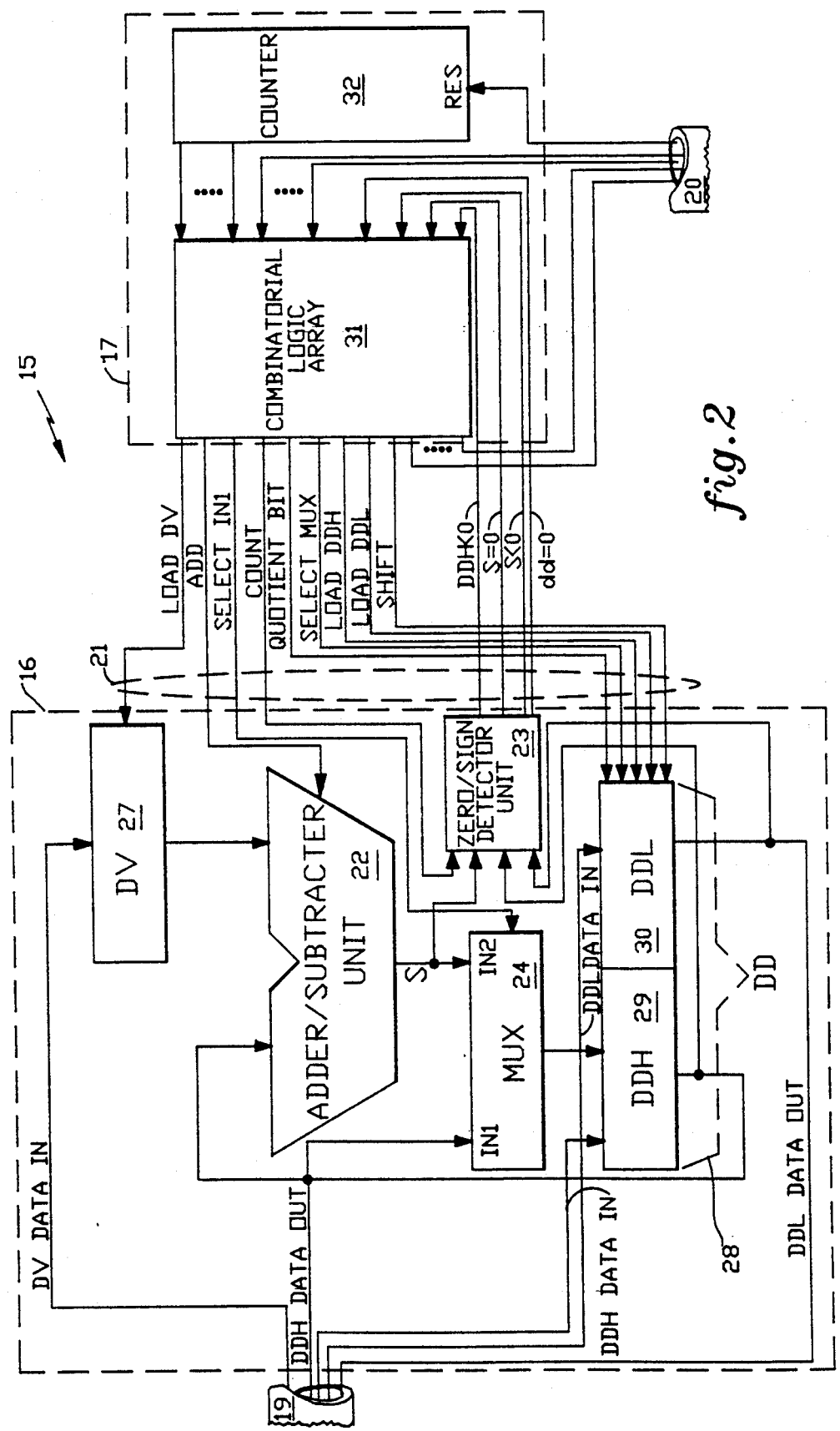
FIG. 2 is a schematic diagram of a divider unit according to the present invention.

FIG. 2 illustrates the divider unit 15 in detail. The divider circuit 16 is comprised of an Adder/Subtracter unit 22, a Zero/Sign Detector unit 23, a mux (multiplexor) 24, a DV (divisor signal) register 27, and a DD (dividend signal) register 28. The DD register 28 is comprised of a DDH (dividend signal high bits) register 29 and a DDL (dividend signal low bits) register 30. Loading or storing the DDH register 29 loads or stores the most significant bits of the DD register 28. Similarly, loading or storing the DDL register 30 loads or stores the least significant bits of the DD register 28.

Data is exchanged between the divider circuit 16 and the central processing/interface unit 13 via the bus 19 which is comprised of the data signals DV Data In, DDH Data Out, DDH Data In, DDL Data Out, and DDL Data In. The DV Data In signal is for transferring data from the central processing/interface unit 13 into the DV register 27. The DDH Data Out signal is for transferring data from the DDH register 29 to the central processing/interface unit 13. The DDH Data In signal is for transferring data from the central processing/interface unit 13 to the DDH register 29. The DDL Data Out signal is for transferring data from the DDL register 30 to the central processing/interface unit 13. The DDL Data In signal is for transferring data from the central processing/interface unit 13 to the DDL register 30.

Control signals which control the operation of the divider circuit 16 are asserted by the divider controller 17. The control signals are part of the bus 21 and include the signals Load DV, Add, Select IN1, Count, Quotient Bit, Select Mux, Load DDH, Load DDL, and Shift. Assertion of the Load DV signal causes the contents of the DV register 27 to equal the DV Data In signal. If the Load DV signal is not asserted, the DV Data In signal does not affect the contents of the DV register 27. Similarly, assertion of the Load DDL signal causes the contents of the DDL register 30 to equal the DDL Data In signal while not asserting the Load DDL signal causes the DDL Data In signal to have no affect on the contents of the DDL register 30.

The Add signal controls the operation of the Adder/Subtracter unit 22. When the Add signal is asserted, the Adder/Subtracter unit 22 adds the signal value of the contents of the DDH register 29 to the signal value of the contents of the DV register 27 to produce a sum result S. (Hereinafter, the signal value of the contents of a register X will simply be referred to as "the register X"). When the Add signal is not asserted, the Adder/Subtracter unit 22 produces a difference result S by subtracting the DV register 27 from the DDH register 29.

The Count signal is an iteration counter which indicates the number of division iterations which have been completed. Binary division is an iterative process wherein the required number of iterations equals the number of bits in the dividend signal.

The Select IN1 signal is a control input to the mux 24. The output of the mux 24 can equal one of two possible values: the IN1 data input or the IN2 data input. When the Select IN1 signal is asserted, the output of the mux 24 equals the IN1 input which is coupled to the data output of the DDH register 29. When the Select IN1 signal is not asserted, the output of the mux 24 equals the IN2 input to the mux 24 which is coupled to the S output of the Adder/Subtracter unit 22.

The Select Mux signal and the Load DDH signal combine to load data into the DDH register 29. There are two possible sources for data for the DDH register 29: the output of the mux 24 and the DDH Data In signal. The simultaneous assertion of the Select Mux signal and the Load DDH signal causes the contents of the DDH register 29 to equal the output of the mux 24. Assertion of the Load DDH signal coupled with the simultaneous non-assertion of the Select Mux signal causes the contents of the DDH register 29 to equal the DDH Data In signal. When the Load DDH signal is not asserted, the DDH register 29 is not affected by either the state of the DDH Data In signal or by the state of the output of the mux 24.

Assertion of the Shift signal causes the DD register 28 to shift left one bit, i.e each bit of the DD register 28 becomes equal to the adjacent lesser significant bit. The Quotient Bit signal is coupled to the DD register 28 so that the Shift signal causes the least significant bit of the DD register 28 to become equal to the Quotient Bit signal. Note that shifting the DD register 28 left one bit causes the most significant bit of the DDL register 30 to become the least significant bit of the DDH register 29.

The Zero/Sign Detector unit 23 has as inputs the contents of the DDH register 29, the contents of the DDL register 30, the Count signal, and the S output of the Adder/Subtracter unit 22. The Detector unit 23 asserts four signals: DDH<0, S=0, S<0, and dd=0 which are part of the bus 21 and which are coupled to the divider controller 17. The DDH<0 signal is asserted whenever the value of the contents of the DDH register 29 is less than zero. The S=0 signal is asserted whenever the value of the S output of the Adder/Subtracter unit 22 equals zero. The S<0 signal is asserted whenever the value of the S output of the Adder/Subtracter unit 22 is less than zero. The dd=0 signal is asserted whenever the dividend signal bits which remain in the DDL register 30 after numerous left shifts (the number of which equals the original number of dividend signal bits minus Count) equal zero. The conditions which cause these signals to be asserted and the meanings of these signals will be explained in more detail, hereinafter.

The divider controller 17 is comprised of a combinatorial logic array 31 and a counter 32. In FIG. 2, the inputs of the logic array 31 are shown on the right hand side of the logic array 31 and the outputs of the logic array 31, which are the control outputs of the divider controller 17, are shown on the left hand side of the logic array 31. The inputs of the logic array 31 determine the state of the divider controller 17. The inputs are comprised of status inputs from the Zero/Sign Detector unit 23 of the divider circuit 16, control signals from the master controller 14, and the output of the counter 32. The counter 32 is driven by an external clock (not shown) which increments the counter 32 thereby changing the inputs to the combinatorial logic 31 which causes the divider controller 17 to sequence through various states. The design and implementation of this type of digital controller is known in the art: see for example pages 102-106 of *Logic and Microcomputer Systems*, C. A. Wiatrowski and C. H. House, pub. by the McGraw-Hill Book Company, New York, New York (1980). Furthermore, the logic array 31 is comprised of non-deterministic combinatorial logic wherein the states of the outputs at a particular time are a function only of the states of the inputs at the same time. Therefore, the logic array 31 can be a ROM (read only memory), a PLA (programmable logic array), or, as in this implementation, discrete digital logic gates. How to use discrete digital logic gates in place of a ROM or a PLA is known in the art, see for example pages 65-67 of *Logic and Microcomputer Systems*, C. A. Wiatrowski and C. H. House, pub. by the McGraw-Hill Book Company, New York, New York (1980).

A divide operation is initiated by the master controller 14 which transmits control signals through the bus 20 to the divider controller 17. One of the signals, coupled to the RES input of the counter 32, causes the output of the counter 32 to be set to binary zero. The remainder of the signals from the master controller 14, which indicate conditions such as the start of a divide operation and the initial signs of the operands, are coupled to the inputs of the logic array 31 and are set in such a way as to cause outputs of the array 31 to begin the control sequence for a divide operation.

As the counter 32 increments, the state of the control signals which are asserted by the divider controller 17 changes because incrementing the counter 32 changes the state of the inputs to the logic array 31. Furthermore, provision for allowing the next state of the divider controller 17 to be determined by conditions within the divider circuitry 16 exists because the outputs of the Zero/Sign Detector unit 23 are coupled to the inputs of the logic array 31. The assertion or nonassertion of particular signals by the Zero/Sign Detector unit 23 changes the state of the inputs to the logic array 31 and hence changes the state of the outputs.

After the last step of a divide operation, the counter 32 increments inputs of the logic array 31 so that a signal, which is coupled to the bus 20 and which indicates that the division process is finished, is asserted by the divider controller 17.

Figure 3:
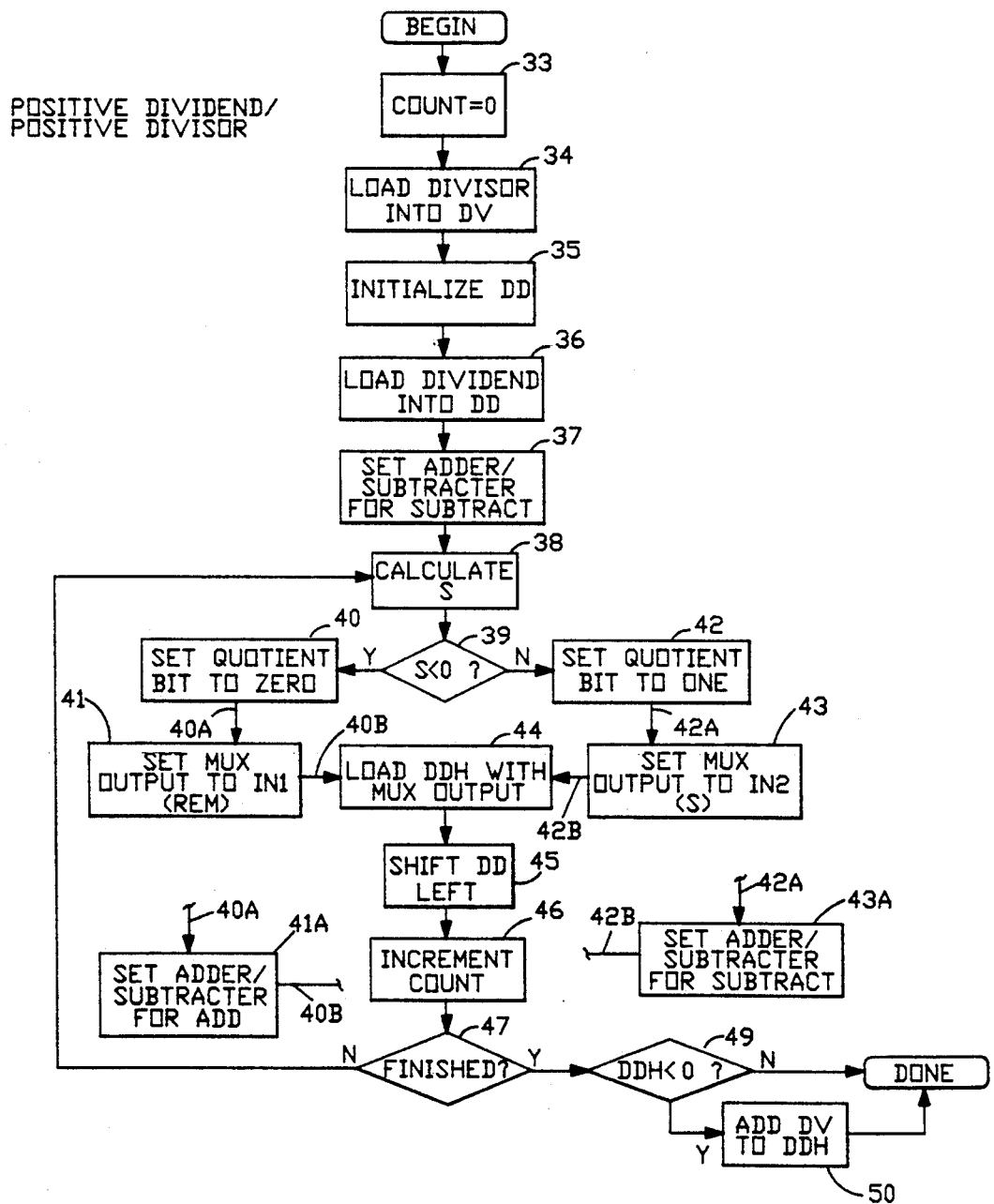
FIG. 3 is a control flow diagram illustrating operation of the divider unit of FIG. 2 in providing for division of a positive dividend by a positive divisor.

FIG. 3 is a control flow diagram illustrating the divider circuit of FIG. 2 being used for fixed point binary division of a positive dividend signal by a positive divisor signal. The division technique can be either restoring division or non-restoring division.

At an initial step 33, an iteration counter (the Count signal from the divider controller 17) is set to zero. The divider controller 17 asserts the Load DV signal in order to load the divisor signal into the DV register 27 at a step 34. The DD register 28 is loaded with the dividend signal at two steps 35, 36. The step 35 initializes the DD register 28 by setting all of the bits to zero. The divider controller 17 causes the dividend signal to be loaded into the DDL register 30 by asserting the Load DDL signal at the step 36. Note that at the step 35, the DDH register 29 is forced to contain zeros, which would not be the case if the step 35 were eliminated since the dividend signal is loaded into the DDL register 30 only.

At a step 37, the divider controller 17 sets the Adder/Subtracter unit 22 for subtraction by not asserting the Add signal. The Adder/Subtracter unit 22 is set for subtract if the signs of the dividend signal and the divisor signal are the same. The Adder/Subtracter unit 22 is set for add if the signs of the dividend signal and the divisor signal are not the same. For restoring division, this setting will remain in effect for all of the iterations of the division. For non-restoring division, the state of the Add signal, and hence whether the Adder/Subtracter unit 22 adds or subtracts, can change for every iteration.

The partial remainder signal, S, is determined at a step 38 where S equals the partial dividend signal, contained in the DDH register 29, minus the divisor signal, contained in the DV register 27. Note that if the Add signal had been asserted by the divider controller 17, the result S would equal the sum of the DDH register 29 and the DV register 27 at the step 38.

The sign of the partial remainder signal, S, is tested at a step 39 where the S<0 signal from the Sign/Zero Detector unit 23 is either asserted or not asserted. If S is negative (i.e. the S<0 signal is asserted), control passes to a step 40 where the Quotient Bit signal is not asserted (i.e. the quotient signal bit for the current iteration is zero).

For restoring division, restoration of the partial remainder signal occurs at a step 41 where the divider controller asserts the Select IN1 signal to set the output of the mux 24 to INI, which is coupled to the DDH register 29 and hence equals the old partial dividend signal. Note that restoration occurs without having to actually add the divisor signal back to the partial remainder signal, S. Since S equals the DDH register 29 minus the DV register 27, then the sum of S and the DV register 27 (i.e. the partial remainder signal after restoration) simply equals the DDH register 29. This type of restoring division is called "non-performing" restoring division because the partial remainder signal is restored to a positive value without having to actually add the divisor signal to a negative partial remainder signal.

For non-restoring division, the divider controller 17 never asserts the Select IN1 signal so that the output of the mux 24 always equals the IN2 input which is coupled to the S output of the Adder/Subtracter unit 22. This occurs because for non-restoring division, there is no restoration step. Instead, non-restoring division requires that a step 41A be substituted for the restoration step 41. Note that two control paths 40A, 40B are shown leading in to and out of both the step 41 and the step 41A. At the step 41A, the Adder/Subtracter unit 22 is set for Add (i.e. the Add signal is asserted by the divider controller 17) so that on the next iteration, S will be the sum of the DV register 27 and the DDH register 29.

If at the test step 39, the partial remainder signal, S, is not negative (i.e. the S<0 signal is not asserted), control passes from the test step 39 to a step 42 where the Quotient Bit signal is asserted (i.e. the quotient signal bit for the current iteration is a one). For restoring division, no restoration of the partial remainder signal is required for the current iteration since S is positive so the divider controller 17 sets the output of the mux 24 to IN2, which equals S, by not asserting the Select IN1 signal at a step 43. For non-restoring division, a step 43A is substituted for the step 43. Note that two control paths 42A, 42B are shown leading in to and out of both the step 43 and the step 43A. At the step 43A, the divider controller 17 sets the Adder/Subtracter unit 22 for subtraction on the next iteration by not asserting the Add signal.

Both branches from the test step 39 converge to a step 44 where the divider controller 17 causes the data from the mux 24 to be transferred to the DDH register 29 by asserting the Select Mux signal and the Load DDH signal. At a step 45, the divider controller 17 asserts the Shift signal to shift the DD register 28 left one bit. Shifting the DD register 28 left one bit shifts the Quotient Bit signal into the least significant bit position of the DDL register 30 and forms a new partial dividend signal in the DDH register 29.

At a step 46, the iteration counter, Count, is incremented. After the step 46, Count equals the number of iterations because Count is initialized to zero at the step 33. Whether the division iterations are completed is determined at a step 47, where the division iterations are completed if value of Count is greater than or equal to the number of bits in the dividend signal. For instance, if the dividend signal contains sixteen bits, the division iterations are completed when Count is greater than or equal to sixteen.

If the division iterations are not completed, control is transferred back to the step 38 where a new partial remainder signal is calculated. If the division iterations are completed, control passes to a test step 49 where it is determined whether the value of the contents of the DDH register 29 is less than zero. Note that the Zero/-Sign detector 23 asserts a signal, DDH<0, whenever the value of the contents of the DDH register 29 is less than zero.

For restoring division, the test at the step 49 will always be false. That is, the value of the contents of the DDH register 29 will always be greater than or equal to zero for restoring division. This occurs because for restoring division, the divider controller 17 asserts or does not assert the Select IN1 signal in response to the sign of S, the output of the Adder/Subtracter unit 22. For the restoring division process, in other words, the divider controller 17 forces the value of the contents of the DDH register 29 to be greater than or equal to zero.

For non-restoring division, however, the DDH register 29 may contain a value which is less than zero since there is no restoration step to select the output of the mux 24 for non-restoring division. If value of the contents of the DDH register 29 is less than zero, control is transferred to a step 50 where the DV register 27 is added to the DDH register 29

For either restoring or non-restoring division, at the completion of the division process the divider controller 17 asserts a signal indicating that the division process is finished, the DDL register 30 contains the quotient signal and the DDH register 29 contains the remainder signal.

Figure 4:
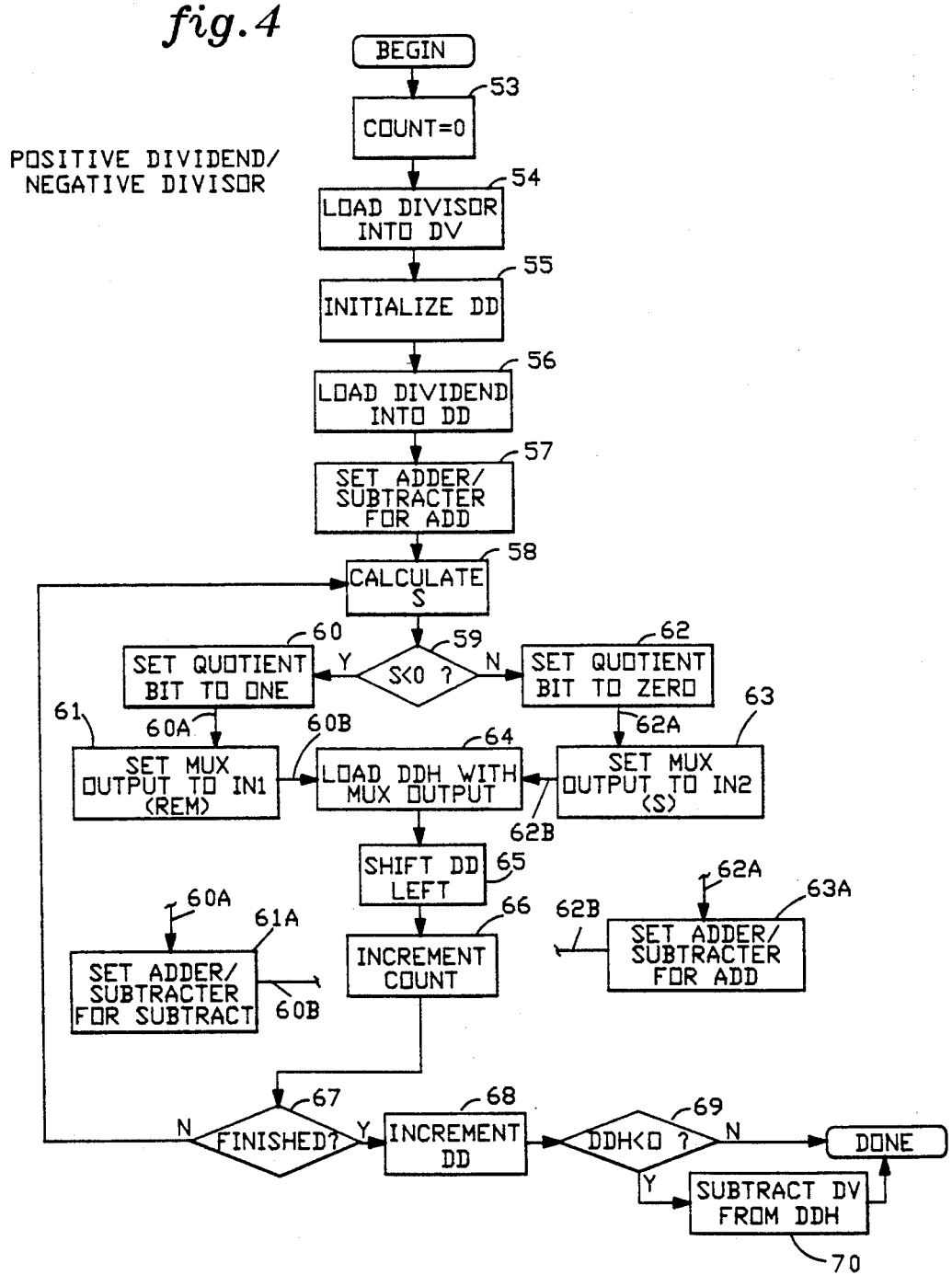
FIG. 4 is a control flow diagram illustrating operation of the divider unit of FIG. 2 in providing for division of a positive dividend by a negative divisor.

FIG. 4 illustrates the control flow diagram for division of a positive fixed point binary dividend signal by a negative fixed point binary divisor signal. At four initializations steps 53-56, the iteration counter, Count, is set to zero, the divisor signal is loaded into the DV register 27, the DD register 28 is initialized by setting all the bits to zero, and the dividend signal is loaded into the DDL register 30. The steps 53-56, and hence the control signals asserted by the divider controller 17, are exactly the same as the respective counterpart steps 33-36 of FIG. 3.

At a step 57, the divider controller 17 sets the Adder/Subtracter unit 22 for addition by asserting the Add signal. As was noted above, the divider controller 17 sets the Adder/Subtracter unit 22 for addition whenever the sign of the dividend signal does not equal the sign of the divisor signal. The partial remainder signal, S, is determined at a step 58 by adding the partial dividend signal, contained in the DDH register 29, to the divisor signal, contained in the DV register 27.

The sign of S is tested at a step 59. If S is less than zero, the Sign/Zero Detector unit 23 asserts the S<0 signal which causes the divider controller 17 to assert the Quotient Bit signal (i.e. the quotient signal bit for the current iteration is one) at a step 60. For restoring division, the divider controller 17 restores the partial remainder signal to a positive value at a step 61 by asserting the Select IN1 signal to set the output of the mux 24 to IN1. For non-restoring division, a step 61A, broken away at two control paths 60A,60B, is substituted for the step 61. At the step 61A, the Adder/Subtracter unit 22 is set for subtract for the next iteration.

If S is not less than zero (i.e the Sign/Zero Detector unit 23 does not assert the S<0 signal), the divider controller 17 unasserts the Quotient Bit signal at a step 62. For restoring division, at a step 63 the divider controller 17 sets the output of the mux 24 to be the IN2 input, i.e. the non-restored positive partial remainder signal S, by not asserting the Select IN1 control input of the mux 24. For non-restoring division, a step 63A, broken away at two control paths 62A,62B, is substituted for the step 63. At the step 63A, the Adder/Subtracter unit 22 is set for add for the next iteration.

Both branches from the test step 59 converge to a step 64 where the divider controller 17 loads the output of the mux 24 into the DDH register 29 by asserting both the Select Mux signal and the Load DDH signal. At a step 65, the divider controller 17 shifts the DD register 28 left one bit. The iteration counter, Count, is incremented at a step 66 and, just as in the flow diagram of FIG. 3, a test is performed at a step 67 to determine if the division iterations are completed. If the division iterations are not completed, control is transferred back to the step 58.

If the iterations are determined to be completed at the step 67, control is transferred to a step 68 where the DD register 28 is incremented. The step 68 is necessary because dividing a dividend signal by a divisor signal having an opposite sign involves forming the one's complement representation of the result. That is, the value in the DDL register 30 immediately prior to execution of the step 68 is the one's complement representation of the quotient signal. The step 68 converts the value in the DDL register 30 to the proper two's complement representation.

Following the step 68 is a test step 69 which tests if the remainder signal, which is in the DDH register 29, has the proper sign. If not, control is transferred to a step 70 where the negative divisor signal, stored in the DV register 27, is subtracted from the remainder signal, located in the DDH register 29. Just as with FIG. 3, for restoring division the DDH register 29 will always contain a remainder signal having the proper sign and so the step 69, 70 are for the benefit of non-restoring division only.

At the completion of the division process, the divider controller 17 asserts a signal indicating that the division process is finished, the two's complement representation of the quotient signal is contained in the DDL register 30 and the remainder signal is contained in the DDH register 29.

Figure 5:
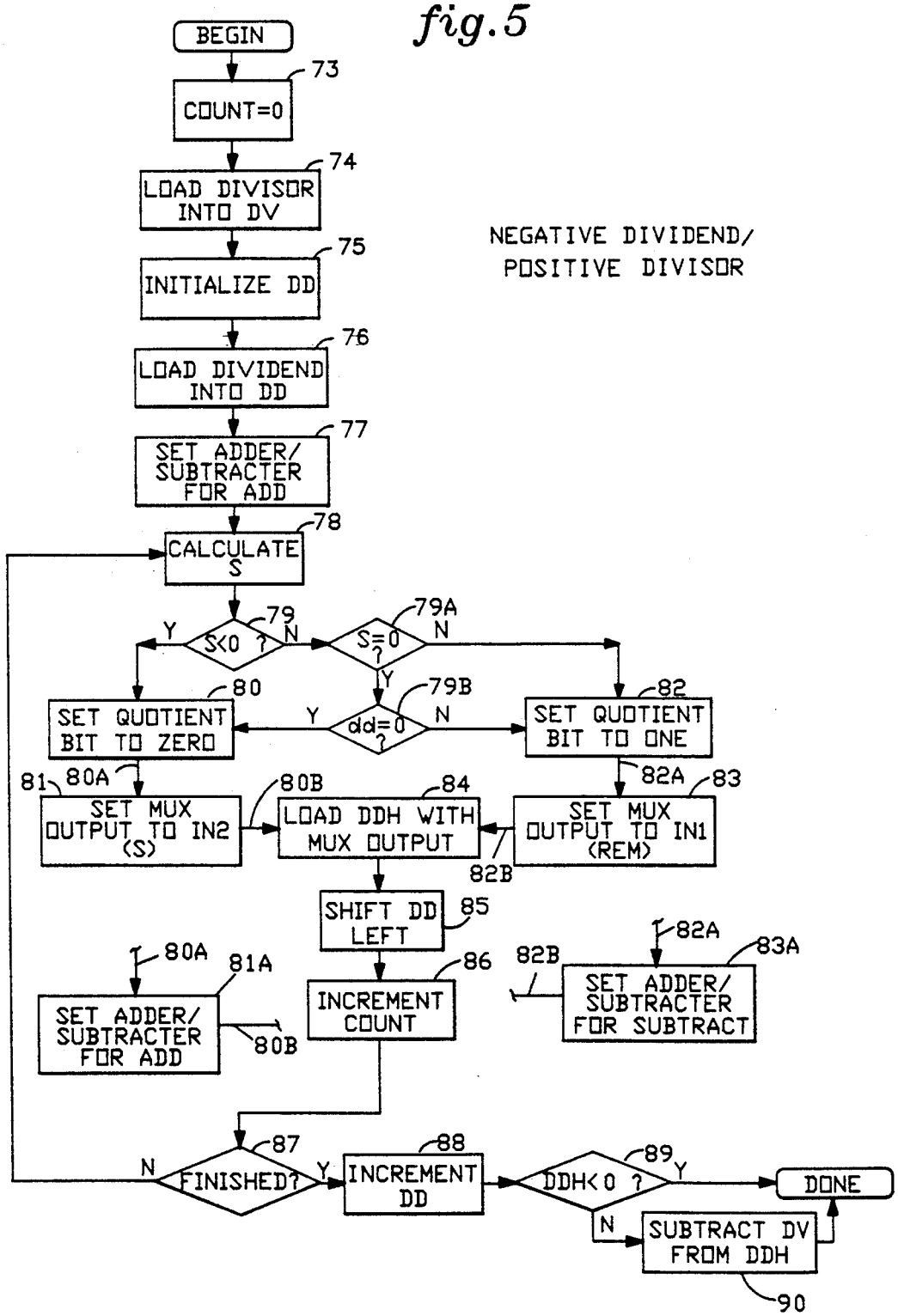
FIG. 5 is a control flow diagram illustrating operation of the divider unit of FIG. 2 in providing for fixed point division of a negative dividend by a positive divisor.

FIG. 5 illustrates the control flow diagram for division of a negative fixed point binary dividend signal by a positive fixed point binary divisor signal. At a step 73 the iteration counter, Count, is set to zero and at a step 74 the divider controller 17 loads the divisor signal into the DV register 27 by asserting the Load DV signal. The DD register 28 is initialized at a step 75. However, for the step 75, all of the bits of the DD register 28 are set to ones and not zeros. This is because the DD register 28 must contain the sign extended representation of the dividend signal after the dividend signal is loaded into the DDL register 30. Since in this case the dividend signal is negative, extending the sign of the negative dividend signal causes the DDH register 29 to contain ones. At a step 76 the divider controller 17 loads the negative dividend signal into the DDL register 30 by asserting the Load DDL signal.

At a step 77, the divider controller 17 asserts the Add signal to set Adder/Subtracter unit 22 for add because the sign of the dividend signal does not equal the sign of the divisor signal. The partial remainder signal, S, is determined at a step 78 by adding the partial remainder signal, contained in the DDH register 29, to the divisor signal, contained in the DV register 27. The sign of the partial remainder signal, S, is tested at a test step 79.

If S is negative, the S<0 signal is asserted and control is transferred to a step 80 where the divider controller 17 unasserts the Quotient Bit signal. For restoring division, at a step 81, which follows the step 80, the divider controller 17 sets the output of the mux 24 to IN2, which equals S, by not asserting the Select IN1 signal. Note that the negative partial remainder signal is not restored. This occurs because applying restoring division to a negative dividend signal requires that the partial dividend signals be negative. For non-restoring division, a step 81A, broken away at two control paths 80A, 80B, is substituted for the step 81. At the step 81A, the Adder/Subtracter unit 22 is set for add for the next iteration.

If S is not negative, control is transferred to a test step 79A, where S is tested for equality to zero. If S is not equal to zero (i.e. the partial remainder signal is a positive, non-zero value), the S=0 signal is not asserted and control is transferred to a step 82 where the Quotient Bit signal is asserted. For restoring division, following the step 82 is a step 83 where the divider controller 17 asserts the Select IN1 signal to set the output of the mux 24 to IN1 (which equals the DDH register 29) in order to restore the positive partial remainder signal to a negative value. For non-restoring division, a step 83A, broken away at two control paths 82A, 82B, is substituted for the step 83. At the step 83A, the Adder/Subtracter unit 22 is set for subtract for the next iteration.

If the partial remainder signal, S, equals zero, the S=0 signal is asserted and control is transferred to a test step 79B. At the step 79B, the dividend signal bits which have not yet been shifted out of the DDL register 30 are tested for equality to zero. Note that the dividend signal is initially stored in the DDL register 30 and that one bit of the dividend signal per iteration is shifted from the DDL register 30 into the DDH register 29. Therefore, for example, at the fifth iteration for division of a sixteen bit dividend signal, the test step 79B would examine bits eleven through zero of the original dividend signal (i.e. the portion of the dividend signal which remains in the DDL register 30). The Zero/Sign detector 23, which asserts the dd=0 signal, uses the Count signal, which indicates the number of iterations which have been completed, to determine which bits of the DDL register 30 to examine.

If all of the bits of the portion of the original dividend signal which remains in the DDL register 30 equal zero, the dd=0 signal is asserted by the Zero/Sign detector 23 and control is transferred from the test step 79B to the step 80. Otherwise, control is transferred from the step 79B to the step 82.

All of the various control branches from the steps 79, 79A, and 79B converge on a step 84 where the divider controller 17 loads the output of the mux 24 into the DDH register 29 by asserting the Select Mux signal and the Load DDH signal. At a subsequent step 85, the divider controller 17 shifts the DD register 28 left one bit. At a step 86 the iteration counter, Count, is incremented and a test step 87 determines if the division iterations are completed. If division iterations are not completed, control is transferred back to the step 78 where a new partial remainder signal is calculated.

If the division iterations are completed, control is transferred to a step 88 where the DD register 28 is incremented (because the sign of the dividend signal does not equal the sign of the divisor signal). After the step 88 are two steps 89,90 where the step 89 is a test step which determines if the value of the contents of the DDH register 29 is less than zero and the step 90 subtracts the divisor signal from the DDH register 29. Note that, just as for the flow diagrams of FIG. 3 and FIG. 4, the transfer of control to the step 90 is only possible for non-restoring division. Note also that the steps 89,90 force the remainder signal to be negative. This occurs because a negative dividend signal requires a negative remainder signal.

At the completion of the division process, the divider controller 17 asserts a signal indicating that the division process is finished, the quotient signal is stored in the DDL register 30 and the remainder signal is stored in the DDH register 29.

Figure 6:
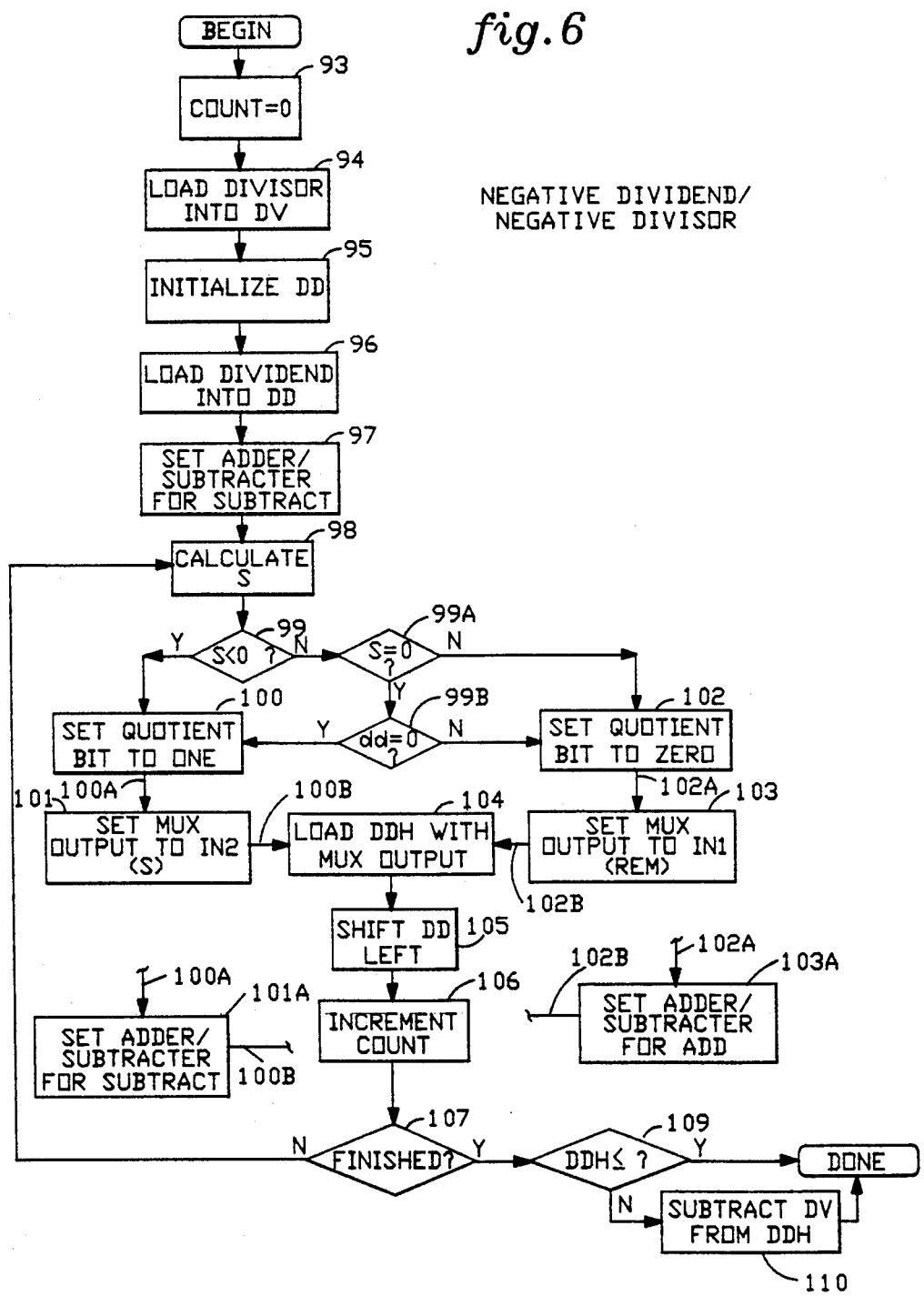
FIG. 6 is a control flow diagram illustrating operation of the divider unit of FIG. 2 in providing for fixed point division of a negative dividend by a negative divisor.

FIG. 6 illustrates the control flow diagram for division of a negative fixed point binary dividend signal by a negative fixed point binary divisor signal. At a step 93 the iteration counter, Count, is set to zero and at a step 94 the divisor signal is loaded into the DV register 27. The DD register 28 is initialized at a step 95. However, just as with the step 75, at the step 95 all of the bits of the DD register 28 are set to ones because the DD register 28 must contain the sign extended representation of the dividend signal, which is negative. At a step 96 the dividend signal is loaded into the DDL register 30.

At a step 97, the divider controller 17 sets the Adder/Subtracter unit 22 for subtract because the sign of the dividend signal equals the sign of the divisor signal. The partial remainder signal, S, is determined at a step 98 by subtracting the divisor signal, contained in the DV register 27, from the partial remainder signal, contained in the DDH register 29. The sign of the partial remainder signal, S, is tested at a test step 99.

If S is negative, the Sign/Zero Detector unit 23 asserts the S<0 signal and control is transferred to a step 100 where the Quotient Bit signal is asserted. For restoring division, at a step 101, which follows the step 100, the divider controller 17 sets the output of the mux 24 to IN2, which equals S, by not asserting the Select IN1 signal. Note that, just as with the step 81, negative partial remainder signals are not restored. For non-restoring division, a step 101A, broken away at two control paths 100A, 100B, is substituted for the step 101. At the step 101A, the Adder/Subtracter unit 22 is set for subtract for the next iteration.

If S is not negative, the S<0 signal is not asserted and control is transferred to a test step 99A, where S is tested for equality to zero. If S is not equal to zero, the Sign/Zero Detector unit 23 does not assert the S=0 signal and control is transferred to a step 102 where the Quotient Bit signal is not asserted. For restoring division, following the step 102 is a step 103 where the divider controller 17 asserts the Select IN1 signal in order to set the output of the mux 24 to IN1 (which equals the DDH register 29) so that the positive partial remainder signal is restored to a negative value. For non-restoring division, a step 103A, broken away at two control paths 102A, 102B, is substituted for the step 103. At the step 103A, the Adder/Subtracter unit 22 is set for add for the next iteration.

If the partial remainder signal, S, equals zero, the S=0 signal is asserted and control is transferred to a test step 99B. At the step 99B, the dividend signal bits which remain in the DDL register 30 (after Count Shift operations) are tested for equality to zero. If all of the bits of the portion of the original dividend signal which remains in the DDL register 30 equal zero, the dd=0 signal is asserted by the Sign/Zero Detector unit 23 and control is transferred from the test step 99B to the step 100. Otherwise, the dd=0 signal is not asserted and control is transferred from the step 99B to the step 102.

All of the various control branches from the steps 99, 99A, and 99B converge on a step 104 where the divider controller 17 causes the output of the mux 24 to be loaded into the DDH register 29 by asserting the Select Mux signal and the Load DDH signal. At a step 105, the divider controller 17 shifts the DD register 28 left one bit. At a subsequent step 106 the iteration counter, Count, is incremented and a test step 107 determines if the division iterations are completed. If the division iterations are not completed, control is transferred back to the step 98 where a new partial remainder signal is calculated.

If the division iterations are completed, control is transferred to a step 109 which is followed by a step 110. The step 109 is a test for determining whether the value of the contents of the DDH register 29 is less than zero and the step 110 adds the divisor signal to the DDH register 29. Note that, just as for the flow diagrams of FIG. 3, FIG. 4, and FIG. 5 the transfer of control to the step 110 is only possible for non-restoring division.

After the division process is finished, the division controller 17 asserts a signal indicating that the division process is finished, the quotient signal is in the DDL register 30 and the remainder signal is in the DDH register 29.

FIGS. 3-6 illustrate the division of fixed point binary values. It is also possible to use the divider unit 15 for division of floating point binary values.

A floating point binary number is comprised of a mantissa, an exponent, and possibly a sign bit. The mantissa can have an implied decimal point between the most significant bit and the second most significant bit so that each bit position of the mantissa, starting with the most significant bit position and working toward the least significant bit position, represents $2^0$, $2^{-1}$, $2^{-2}$, and so on. Furthermore, a signed floating point binary value can have either a separate sign bit, as with the IEEE standard discussed supra, or the mantissa can be represented as a two's complement value so that the most significant bit position represents $-2^0$ instead of $2^0$. Division of floating point values is accomplished by subtracting the divisor signal exponent from the dividend signal exponent to obtain the quotient signal exponent and by dividing the dividend signal mantissa by the divisor signal mantissa to obtain the quotient signal mantissa. No remainder signal is generated since any fractional results become part of the resultant mantissa.

Note that fixed point binary division cannot be used to divide the dividend signal mantissa by the divisor signal mantissa because the quotient signal mantissa is a fractional value and not a whole value. For example, dividing a mantissa of 001 (decimal 0.25) by a mantissa of 010 (decimal 0.5) should yield a mantissa of 010 (decimal 0.5), but applying fixed point division to divide 001 by 010 yields zero. It is possible to adapt the dividend signal mantissa so that the adapted dividend signal mantissa can be divided by the divisor signal mantissa using fixed point binary division. This is done by shifting the dividend signal mantissa left a number of bits equal to the number of bits in the mantissa.

For instance, the control flow diagram of FIG. 3 can be used for illustrating the division of a positive floating point dividend signal mantissa by a positive floating point divisor signal mantissa. At the step 36, where the dividend signal is loaded into the DD register 30, the divider controller 17 loads the dividend signal into the DDH register 29 portion of the DD register 28 instead of the DDL register 30. When the division is complete, the quotient signal mantissa is stored in the DDL register 30. Note, however, that the steps 49,50, which add the divisor signal to a negative remainder signal in order to ensure that a non-restoring division remainder signal is positive, are not needed for floating point division, which does not generate a remainder signal.

Similarly, FIG. 4 can be used for illustrating the division of a positive floating point dividend signal mantissa by a negative floating point divisor signal mantissa. At the step 56, the divider controller 17 loads the dividend signal into the DDH register 29 instead of the DDL register 30. Just as with using FIG. 3 for floating point division, the steps 69,70 of FIG. 4 are not needed.

Figure 7:
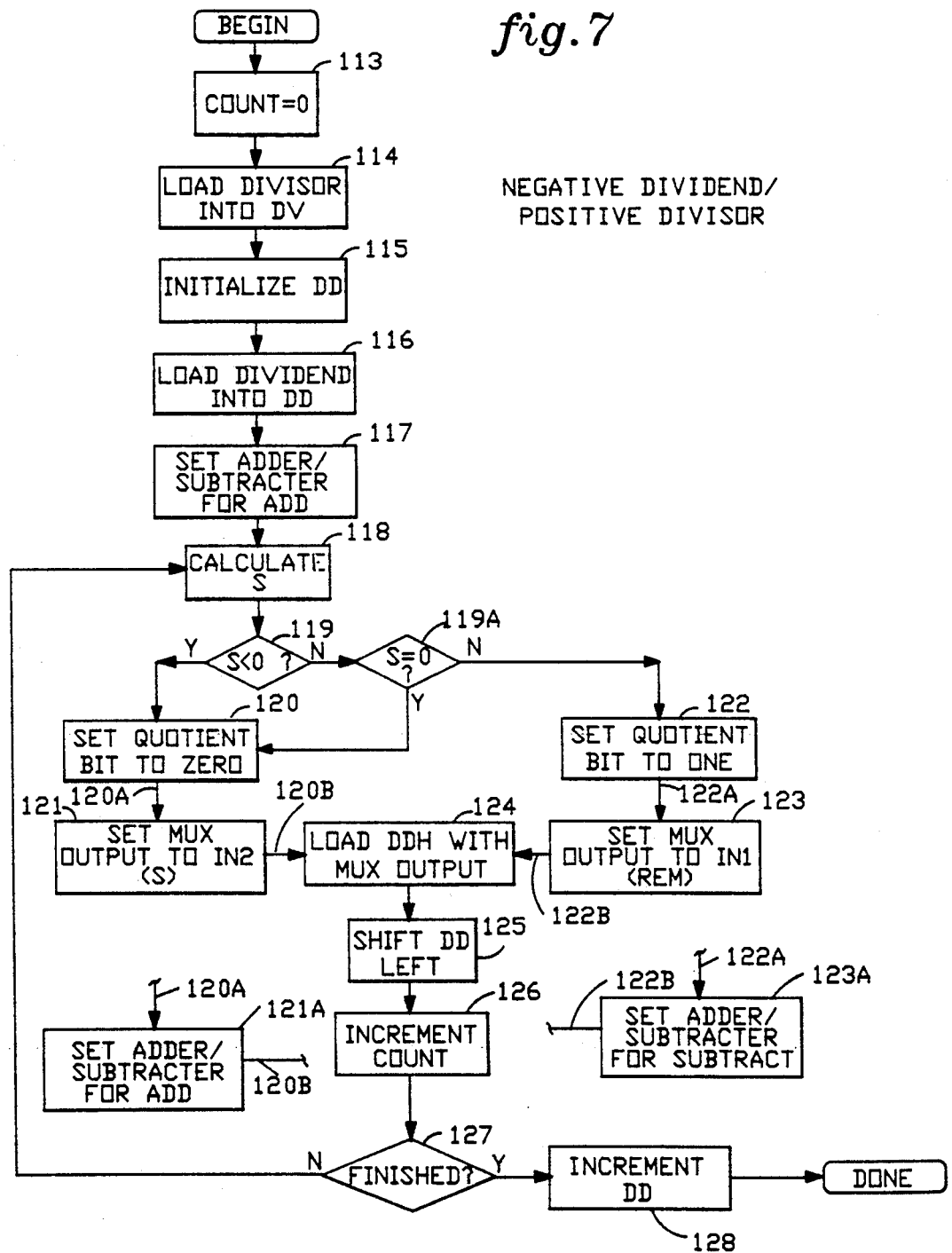
FIG. 7 is a control flow diagram illustrating operation of the divider unit of FIG. 2 in providing for floating point division of a negative dividend by a positive divisor.

FIG. 7 illustrates the control flow diagram for division of a negative binary floating point dividend signal mantissa by a positive binary floating point divisor signal mantissa. At a step 113 the iteration counter, Count, is set to zero and at a step 114 the divider controller 17 asserts the Load DV signal to load the divisor signal into the DV register 27. The DD register 28 is initialized to contain all zeros at a step 115. At a step 116, the divider controller 17 loads the dividend signal into the DDH register 29 by not asserting the Select Mux signal and by asserting the Load DDH signal. Note that there can be no sign extension of the dividend signal since loading the dividend signal into the DDH register 29 places the most significant bit of the dividend signal at the most significant bit position of the DD register 28. At a step 117, the divider controller 17 asserts the Add signal in order to set the Adder/Subtracter unit 22 for add because the sign of the dividend signal is not the same as the sign of the divisor signal.

At a step 118, the partial remainder signal, S, is formed by adding the partial dividend signal, contained in the DDH register 29, to the divisor signal, contained in the DV register 27. The sign of S is tested at a test step 119. If S is less than zero, the S<0 signal is asserted and control is transferred to a step 120 where the Quotient Bit signal is asserted. For restoring division, following the step 120 is a step 121 where the divider controller 17 does not assert the Select IN1 signal so that the output of the mux 24 becomes IN2, which equals S, the non-restored partial remainder signal. As was noted above, when the dividend signal is negative, negative partial remainder signals are not restored and positive partial remainder signals are restored. For non-restoring division, a step 121A, broken away at two control paths 120A, 120B, is substituted for the step 121. At the step 121A, the Adder/Subtracter unit 22 is set for add for the next iteration.

If S is not negative, the Sign/Zero Detector unit 23 does not assert the S<0 signal and control is transferred from the test step 119 to a test step 119A, where S is tested for equality to zero. If S does not equal zero, the S=0 signal is not asserted and control is transferred to a step 122 where the Quotient Bit signal is asserted. For restoring division, following the step 122 is a step 123 where the divider controller 17 asserts the Select IN1 signal in order to restore the partial remainder signal by setting the output of the mux 24 to IN1, the DDH register 29. For non-restoring division, a step 123A, broken away at two control paths 122A, 122B, is substituted for the step 123. At the step 123A, the Adder/Subtracter unit 22 is set for subtract for the next iteration.

If S is equal to zero, the S=0 signal is asserted and control is transferred to the step 120.

All of the various branches from the test steps 119,119A converge at a step 124 where the divider controller 17 loads the output of the mux 24 into the DDH register 29 by asserting the Load DDH signal and the Select Mux signal. At a step 125, the divider controller 17 shifts the DD register 28 left one bit. Count is incremented at a step 126 and whether the division iterations are completed is tested at a step 127. If the division iterations are not completed, control is transferred back to the step 118. Otherwise, control is transferred to a step 128, where the DD register is incremented. After the step 128, the divider controller 17 asserts a signal indicating that the division process is finished and the quotient signal is in the DDL register 29. No remainder signal is generated.

Figure 8:
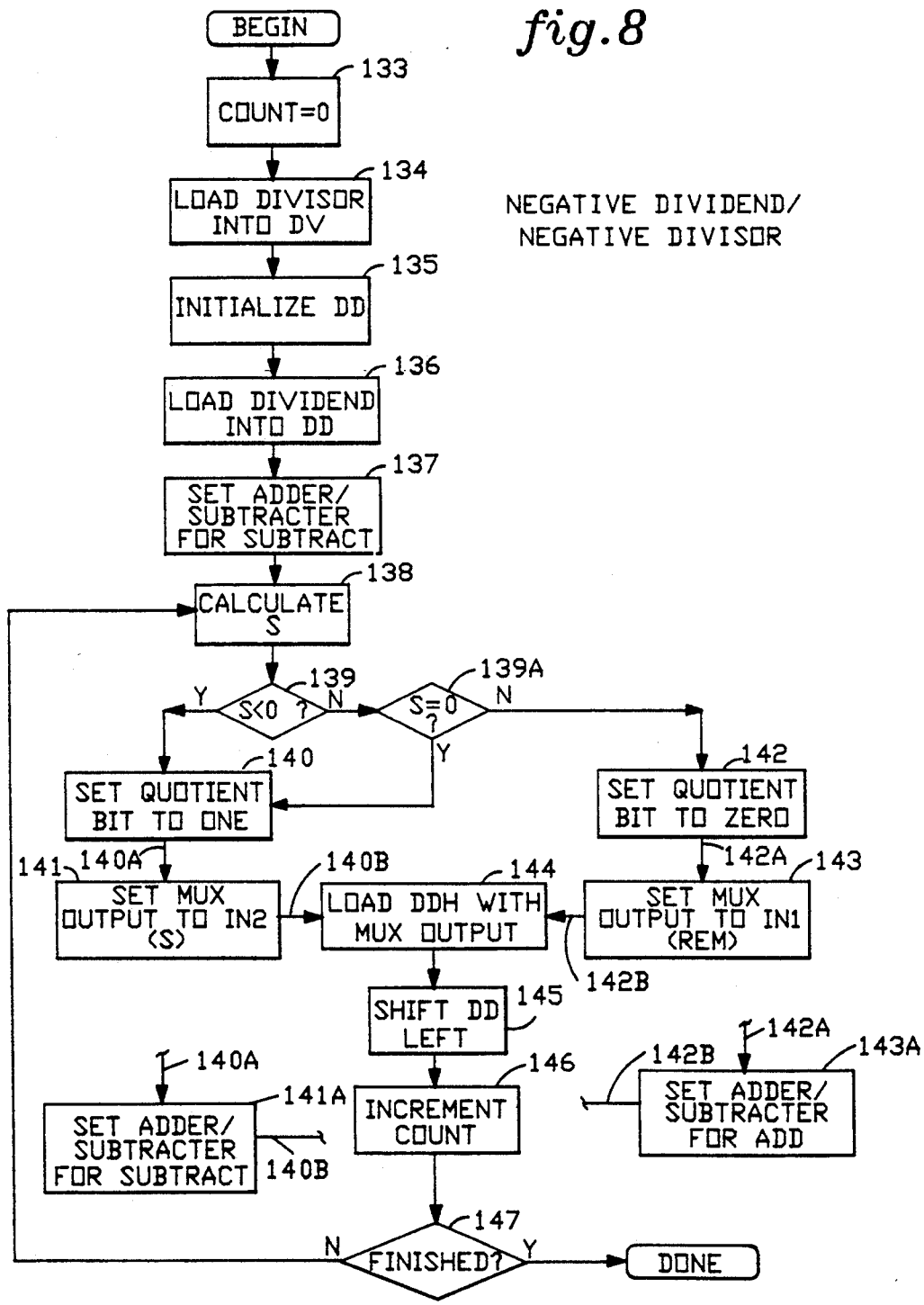
FIG. 8 is a control flow diagram illustrating operation of the divider unit of FIG. 2 in providing for floating point division of a negative dividend by a negative divisor.

FIG. 8 illustrates the control flow diagram for division of a negative binary floating point dividend signal mantissa by a negative binary floating point divisor signal mantissa. At a step 133 the iteration counter, Count, is set to zero and at a step 134 the divider controller 17 loads the divisor signal into the DV register 27. The DD register 28 is initialized to contain all zeros at a step 135. At a step 136, the dividend signal is loaded into the DDH register 29. At a step 137, the divider controller 17 sets the Adder/Subtracter unit 22 for subtract because the sign of the dividend signal is the same as the sign of the divisor signal.

At a step 138, the partial remainder signal, S, is formed by subtracting the divisor signal, contained in the DD register 27, from the partial dividend signal, contained in the DDH register 29. The sign of S is tested at a test step 139. If S is less than zero, the S<0 signal is asserted and control is transferred to a step 140 where the Quotient Bit signal is asserted. For restoring division, following the step 140 is a step 141 where the divider controller 17 does not assert Select IN1 and thereby sets the output of the mux 24 to IN2, which equals S, the non-restored partial remainder signal. For non-restoring division, a step 141A, broken away at two control paths 140A, 140B, is substituted for the step 141. At the step 141A, the Adder/Subtracter unit 22 is set for subtract for the next iteration.

If S is not negative, the S<0 signal is not asserted and control is transferred from the test step 139 to a test step 139A, where S is tested for equality to zero. If S does not equal zero, the S=0 signal is not asserted and control is transferred to a step 142 where the Quotient Bit signal is not asserted. For restoring division, following the step 142 is a step 143 where the divider controller 17 restores the partial remainder signal by asserting the Select IN1 signal and thereby setting output of the mux 24 to IN1, the DDH register 29. For non-restoring division, a step 143A, broken away at two control paths 142A, 142B, is substituted for the step 143. At the step 143A, the Adder/Subtracter unit 22 is set for add for the next iteration.

If S is equal to zero, the S=0 signal is asserted and control is transferred to the step 140.

All of the various branches from the test steps 139,139A converge at a step 144 where the divider controller 17 loads the output of the mux 24 into the DDH register 29 by asserting the signal Load DDH and the signal Select Mux. At a step 145, the divider controller 17 asserts the Shift signal to shift the DD register 28 left one bit. Count is incremented at a step 146 and whether the division iterations are completed is tested at a step 147. If the division iterations are not completed, control is transferred back to the step 138. Otherwise, a signal indicating that the division process is finished is asserted and the quotient signal is in the DDL register 29. No remainder signal is generated.

The invention may be practiced with registers and other elements having any number of bits. Although the divider unit 15 is shown as part of the microprocessor 12, the divider unit 15 may be implemented as either part of another type of digital device or as a stand-alone unit. The data bus 19 and the control bus 20 may each be broken into a plurality of buses. Similarly, the buses 19,20 may be combined into one bus.

The specific hardware shown for the divider controller 17 is not important to the invention, and any other type of digital controller hardware may be used. Similarly, different hardware, having the same functionality, may be substituted for the divider circuit 16. Furthermore, either the divider controller 17 or the divider circuit 16 or both may be implemented by software executed in a microprocessor, which would be straightforward in view of the hardware/software equivalence discussed (in another field) in U.S. Pat. No. 4,294,162 entitled "Force Feel Actuator Fault Detection with Directional Threshold" (Fowler et al.).

Although the invention has been shown and described with respect to exemplary embodiments thereof, it should be understood by those skilled in the art that various changes, omissions and additions may be made therein and thereto, without departing from the spirit and the scope of the invention.

We claim:

1. A divider unit, for iteratively applying restoring division to signed, fixed point, binary operands, comprising:
    a first storage means for storing a divisor signal;
    a second storage means, for storing a dividend signal, responsive to a SHIFT signal and a QUOTIENTBIT signal, wherein asserting said SHIFT signal causes contents of said second storage means to shift left one bit and causes the least significant bit of said second storage means to equal said QUOTIENTBIT signal;
    a third storage means, responsive to said SHIFT signal and to the most significant bit of said second storage means, wherein asserting said SHIFT signal causes contents of said third storage means to shift left one bit and causes the least significant bit of said third storage means to equal the most significant bit of said second storage means;
    input means, for providing said divisor signal to said first storage means, for providing said dividend signal to said second storage means, and for providing a signal having all bits equal to the most significant bit of said dividend signal to said third storage means;
    addition/subtraction means, having a divisor signal input coupled to said first storage means, a partial dividend signal input coupled to said third storage means, and a control input for receiving an ADD signal, for providing a partial remainder signal output, wherein said partial remainder signal equals the sum of said divisor signal and said partial dividend in response to said ADD signal being asserted and said partial remainder signal equals said partial dividend signal minus said divisor signal in response to said ADD signal not being asserted;
    multiplexing means, responsive to said partial dividend signal, said partial remainder signal, and a SELECTIN1 signal, for providing a mux output signal to said third storage means, wherein said mux output signal equals said partial dividend signal in response to said SELECTIN1 signal being asserted and wherein said mux output signal equals said partial remainder signal in response to said SELECTIN1 signal not being asserted;
    zero/sign detector means, responsive to a COUNT signal, said partial remainder signal, and said second and third storage means, for providing a DDH<0 signal in response to said third storage means being less than zero, for providing an S=0 signal in response to said partial remainder signal equalling zero, for providing an S<0 signal in response to said partial remainder signal being less than zero, and for providing a dd=0 signal in response to a number of most significant bits of said second storage means indicating a signal value of zero, said number being indicated by said COUNT signal; and
    controlling means, responsive to said DDH<0, S=0, S<0, and dd=0 signals, for asserting said ADD signal in response to said divisor signal and said dividend signal having opposite signs, for asserting said SELECTIN1 signal in response to said divisor and said dividend signals being positive and said S<0 signal being asserted, for asserting said SELECTIN1 signal in response to said dividend signal being positive, said divisor signal being negative and said S<0 signal being asserted, for asserting said SELECTIN1 signal in response to said dividend signal being negative, said divisor signal being positive, said S<0 signal not being asserted and either said S=0 signal not being asserted or said dd=0 signal not being asserted, for asserting said SELECTIN1 signal in response to said dividend and divisor signals being negative, said S<0 signal not being asserted, and either said S=0 signal not being asserted or said dd=0 signal not being asserted, for providing said COUNT signal equal to the number of division iterations, for asserting said QUOTIENTBIT signal in response to said divisor and said dividend signals being positive and said S<0 signal not being asserted, for asserting said QUOTIENTBIT signal in response to said dividend signal being positive, said divisor signal being negative and said S<0 signal being asserted, for asserting said QUOTIENTBIT signal in response to said dividend signal being negative, said divisor signal being positive, said S<0 signal not being asserted and either said S=0 signal not being asserted or said dd=0 signals not being asserted, for asserting said QUOTIENTBIT signal in response to said dividend and divisor signals being negative, and either said S<0 being asserted or said S=0 and dd=0 signals being asserted, and for asserting said SHIFT signal once per division iteration.

2. A divider unit, for iteratively applying non-restoring division to signed, fixed point, binary operands, comprising:
    a first storage means for storing a divisor signal;
    a second storage means, for storing a dividend signal, responsive to a SHIFT signal and a QUOTIENTBIT signal, wherein asserting said SHIFT signal causes contents of said second storage means to shift left one bit and causes the least significant bit of said second storage means to equal said QUOTIENTBIT signal;
    a third storage means, responsive to said SHIFT signal and to the most significant bit of said second storage means, wherein asserting said SHIFT signal causes contents of said third storage means to shift left one bit and causes the least significant bit of said third storage means to equal the most significant bit of said second storage means;
    input means, for providing said divisor signal to said first storage means, for providing said dividend signal to said second storage means, and for providing a signal having all bits equal to the most significant bit of said dividend signal to said third storage means;

addition/subtraction means, having a divisor signal input coupled to said first storage means, a partial dividend signal input coupled to said third storage means, and a control input for receiving an ADD signal, for providing a partial remainder signal output, wherein said partial remainder signal equals the sum of said divisor signal and said partial dividend in response to said ADD signal being asserted and said partial remainder signal equals said partial dividend signal minus said divisor signal in response to said ADD signal not being asserted;

means for providing said partial remainder signal to said third storage means;

zero/sign detector means, responsive to a COUNT signal, said partial remainder signal, and said second and third storage means, for providing a $DDH=0$ signal in response to said third storage means being less than zero, for providing an $S=0$ signal in response to said partial remainder signal equalling zero, for providing an $S<0$ signal in response to said partial remainder signal being less than zero, and for providing a $dd=0$ signal in response to a number of most significant bits of said second storage means indicating a signal value of zero, said number being indicated by said COUNT signal; and controlling means, responsive to said $DDH<0$ signal, said $S=0$ signal, said $S<0$ signal, and said $dd=0$ signal, for asserting said ADD signal for the first division iteration in response to said divisor signal and said dividend signal having opposite signs, for asserting said ADD signal in response to said divisor and said dividend signals being positive and said $S<0$ signal being asserted, for asserting said ADD signal in response to said dividend signal being positive, said divisor signal being negative and said $S<0$ signal not being asserted, for asserting said ADD signal in response to said dividend signal being negative, said divisor signal being positive, and either said $S<0$ signal being asserted or said $S=0$ and $dd=0$ signals being asserted, for asserting said ADD signal in response to said dividend and divisor signal being negative, said $S<0$ signal not being asserted, and either said $S=0$ signal not being asserted or said $dd=0$ signal not being asserted, for providing said COUNT signal equal to the number of division iterations, for asserting said QUOTIENTBIT signal in response to said divisor and said dividend signals being positive and said $S<0$ signal not being asserted, for asserting said QUOTIENTBIT signal in response to said dividend signal being positive, said divisor signal being negative and said $S<0$ signal being asserted, for asserting said QUOTIENTBIT signal in response to said dividend signal being negative, said divisor signal being positive, said $S<0$ signal not being asserted and either said $S=0$ signal not being asserted or said $dd=0$ signal not being asserted, for asserting said QUOTIENTBIT signal in response to said dividend and divisor signals being negative, and either said $S<0$ being asserted or said $S=0$ and $dd=0$ signals being asserted, and for asserting said SHIFT signal once per division iteration.

3. A divider unit, of iteratively applying restoring division to signed, floating point, binary operands, comprising:

a first storage means for storing a divisor signal;

a second storage means, responsive to a SHIFT signal and a QUOTIENTBIT signal, wherein asserting said SHIFT signal causes contents of said second storage means to shift left one bit and causes the least significant bit of said second storage means to equal said QUOTIENTBIT signal;

a third storage means, for storing a dividend signal, responsive to said SHIFT signal and to the most significant bit of said second storage means, wherein asserting said SHIFT signal causes contents of said third storage means to shift left one bit and causes the least significant bit of said third storage means to equal the most significant bit of sad second storage means;

input means, for providing said divisor signal to said first storage means, for providing a signal indicative of binary zero to said second storage means, and for providing said dividend signal to said third storage means;

addition/subtraction means, having a divisor signal input coupled to said first storage means, a partial dividend signal input coupled to said third storage means, and a control input for receiving an ADD signal, for providing a partial remainder signal output, wherein said partial remainder signal equals the sum of said divisor signal and said partial dividend in response to said ADD signal being asserted and said partial remainder signal equals said partial dividend signal minus said divisor signal in response to said ADD signal not being asserted;

multiplexing means, responsive to said partial dividend signal, said partial remainder signal, and a SELECTIN1 signal, for providing a mux output signal to said third storage means, wherein said mux output signal equals said partial dividend signal in response to said SELECTIN1 signal being asserted and wherein said mux output signal equals said partial remainder signal in response to said SELECTIN1 signal not being asserted;

zero/sign detector means, responsive to a COUNT signal, said partial remainder signal, and said second and third, storage means, for providing a $DDH<0$ signal in response to said third storage means being less than zero, for providing an $S=0$ signal in response to said partial remainder signal equalling zero, for providing an $S<0$ signal in response to said partial remainder signal being less than zero, and for providing a $dd=0$ signal in response to a number of most significant bits of said second storage means indicating a signal value of zero, said number being indicated by said COUNT signal; and controlling means, responsive to said $DDH<0$, $S=0$, $S<0$, and $dd=0$ signals, for asserting said ADD signal in response to said divisor signal and said dividend signal having opposite signs, for asserting said SELECTIN1 signal in response to said divisor and said dividend signals being positive and said $S<0$ signal being asserted, for asserting said SELECTIN1 signal in response to said dividend signal being positive, said divisor signal being negative and said $S<0$ signal being asserted, for asserting said SELECTIN1 signal in response to said dividend signal being negative, said divisor signal being positive, and said S<0 and S=0 signals not being asserted, for asserting said SELECTIN1 signal in response to said dividend and divisor signals being negative and said S<0 and S=0 signals not being asserted, for providing said COUNT signal equal to the number of division iterations, for asserting said QUOTIENTBIT signal in response to said divisor and said dividend signals being positive and said S<0 signal not being asserted, for asserting said QUOTIENTBIT signal in response to said dividend signal being positive, said divisor signal being negative and said S<0 signal being asserted, for asserting said QUOTIENTBIT signal in response to said dividend signal being negative, said divisor signal being positive, said S<0 and S=0 signals not being asserted, for asserting said QUOTIENTBIT signal in response to said dividend and divisor signals being negative, and said S<0 and S=0 and dd=0 signals not being asserted, and for asserting said SHIFT signal once per division iteration.

4. A divider unit, for iteratively applying non-restoring division to signed, floating point, binary operands, comprising:

a first storage means for storing a divisor signal;

a second storage means, responsive to a SHIFT signal and a QUOTIENTBIT signal, wherein asserting said SHIFT signal causes contents of said second storage means to a shift left one bit and causes the least significant bit of said second storage means to equal said QUOTIENTBIT signal;

a third storage means, for storing a dividend signal, responsive to said SHIFT signal and to the most significant bit of said second storage means, wherein asserting said SHIFT signal causes contents of said third storage means to shift left one bit and causes the least significant bit of said third storage means to equal the most significant bit of said second storage means;

input means, for providing said divisor signal to said first storage means, for providing a signal indicative of binary zero to said second storage means, and for providing said dividend signal to said third storage means;

addition/subtraction means, having a divisor signal input coupled to said first storage means, a partial dividend signal input coupled to said third storage means, and a control input for receiving an ADD signal, for providing a partial remainder signal output, wherein said partial remainder signal equals the sum of said divisor signal and said partial dividend in response to said ADD signal being asserted and said partial remainder signal equals said partial dividend signal minus said divisor signal in response to said ADD signal not being asserted;

means for providing said partial remainder signal to said third storage means;

zero/sign detector means, responsive to a COUNT signal, said partial remainder signal, and said second and third storage means, for providing a DDH<0 signal in response to said third storage means being less than zero, for providing an S=0 signal in response to said partial remainder signal equalling zero, for providing an S<0 signal in response to said partial remainder signal being less than zero, and for providing a dd=0 signal in response to a number of most significant bits of said second storage means indicating a signal value of zero, said number being indicated by said COUNT signal; and controlling means, responsive to said DDH<0, S=0, S<0, and dd=0 signals, for asserting said ADD signal for the first division iteration in response to said divisor signal and said dividend signal having opposite signs, for asserting said ADD signal in response to said divisor and said dividend signals being positive and said S<0 signal being asserted, for asserting said ADD signal in response to said dividend signal being positive, said divisor signal being negative and said S<0 signal not being asserted, for asserting said ADD signal in response to said dividend signal being negative, said divisor signal being positive, and either said S<0 signal being asserted or said S=0 signal being asserted, for asserting said ADD signal in response to said dividend and divisor signals being negative and said S<0 and S=0 signals not being asserted, for providing said COUNT signal equal to the number of division iterations, for asserting said QUOTIENTBIT signal in response to said divisor and said dividend signals being positive and said S<0 signal not being asserted, for asserting said QUOTIENTBIT signal in response to said dividend signal being positive, said divisor signal being negative and said S<0 signal being asserted, for asserting said QUOTIENTBIT signal in response to said dividend signal being negative, said divisor signal being positive, said S<0 signal not being asserted and either said S=0 signal not being asserted or said dd=0 signals not being asserted, for asserting said QUOTIENTBIT signal in response to said dividend and divisor signals being negative, and either said S<0 being asserted or said S=0 and dd=0 signals being asserted, and for asserting said SHIFT signal once per division iteration.

* * * * *

UNITED STATES PATENT AND TRADEMARK OFFICE
CERTIFICATE OF CORRECTION

PATENT NO. : 5,016,210

DATED : May 14, 1991

INVENTOR(S) : Brian J. Sprague and Gregory A. Portanova

It is certified that error appears in the above-identified patent and that said Letters Patent is hereby corrected as shown below:

Column 15, line 59, "SELECTINI1" should read --SELECTIN1--.

Column 17, line 22, "DDH=0" should read --DDH<0--.

Column 17, line 48, "signal" should read --signals--.

Column 18, line 1, "of" should read --for--.

Signed and Sealed this

Twenty-second Day of December, 1992

Attest:

DOUGLAS B. COMER

*Attesting Officer*     *Acting Commissioner of Patents and Trademarks*